(12) United States Patent
Cenciarelli et al.

(10) Patent No.: US 10,810,644 B2
(45) Date of Patent: Oct. 20, 2020

(54) MITIGATION METHOD, SYSTEM AND NON-TRANSITORY COMPUTER-READABLE DEVICE

(71) Applicants: AT&T INTELLECTUAL PROPERTY I, L.P., Atlanta, GA (US); AT&T Mobility II LLC, Atlanta, GA (US)

(72) Inventors: Fulvio Cenciarelli, Suwanee, GA (US); Quinn Aguirre, Duluth, GA (US); John P. Davis, III, Marietta, GA (US); Jeffrey Mikan, Atlanta, GA (US)

(73) Assignees: AT&T INTELLECTUAL PROPERTY I, L.P., Atlanta, GA (US); AT&T Mobility II LLC, Atlanta, GA (US)

( * ) Notice: Subject to any disclaimer, the term of this patent is extended or adjusted under 35 U.S.C. 154(b) by 424 days.

(21) Appl. No.: 14/945,078

(22) Filed: Nov. 18, 2015

(65) Prior Publication Data

US 2017/0140448 A1    May 18, 2017

(51) Int. Cl.
*G06Q 30/00* (2012.01)
*G06Q 30/06* (2012.01)

(52) U.S. Cl.
CPC ..... *G06Q 30/0613* (2013.01); *G06Q 30/0635* (2013.01)

(58) Field of Classification Search
CPC ............. G06Q 30/0601–0645; G06Q 30/0613
(Continued)

(56) References Cited

U.S. PATENT DOCUMENTS 5,517,405 A    5/1996    Mcandrew et al.
5,991,799 A    11/1999    Yen et al.
(Continued)

FOREIGN PATENT DOCUMENTS

WO    2015101464    7/2015

OTHER PUBLICATIONS

Apple inc.; patent issued for presenting compatible components and system conditions for computer devices. (Sep. 10, 2014). Journal of Engineering Retrieved from https://search.proquest.com/docview/1559950682?accountid=14753 (Year: 2014).*
(Continued)

*Primary Examiner* — Brittney N Miller
*Assistant Examiner* — Arielle E Weiner
(74) *Attorney, Agent, or Firm* — Akerman LLP; Michael K. Dixon; Mammen (Roy) P. Zachariah, Jr.

(57) ABSTRACT

A system for mitigating returns is disclosed. In particular, the system may analyze an order made by a user for an item. The system may apply one or more filters to the order to determine if the ordered item is compatible with the user's profile, devices, accounts, preferences, or a combination thereof. Based on the application of the filters, the system may determine if a conflict exists between the ordered item and the user's profile, devices, accounts, preferences. If a conflict is determined to exist, the system may notify the user and adjust the order to generate a new order for a different item that is compatible for the user so as to mitigate a return. An order may then be transmitted to a virtual assistant for approval, which may reject the order or approve the order for completion.

20 Claims, 4 Drawing Sheets

(58) Field of Classification Search
USPC .................................. 705/26.1–27.2, 26.41
See application file for complete search history.

(56) References Cited

U.S. PATENT DOCUMENTS

| | | | |
|---|---|---|---|
| 6,434,549 B1 | 8/2002 | Linetsky et al. | |
| 6,556,976 B1 | 4/2003 | Callen | |
| 7,383,200 B1 | 6/2008 | Walker et al. | |
| 7,802,200 B1* | 9/2010 | Siegel | G06Q 30/0633 |
| | | | 705/26.8 |
| 8,073,839 B2 | 12/2011 | Rathod | |
| 8,639,587 B1 | 1/2014 | Whang | |
| 8,655,820 B2 | 2/2014 | Fein et al. | |
| 2001/0037206 A1* | 11/2001 | Falk | G06Q 30/02 |
| | | | 705/1.1 |
| 2002/0065736 A1* | 5/2002 | Willner | G06Q 10/087 |
| | | | 705/26.81 |
| 2004/0024656 A1 | 2/2004 | Coleman | |
| 2008/0052138 A1* | 2/2008 | Marsh | G06Q 10/06311 |
| | | | 705/7.13 |
| 2008/0228503 A1* | 9/2008 | Buchheit | G06Q 30/0603 |
| | | | 705/1.1 |
| 2009/0171760 A1* | 7/2009 | Aarnio | G06Q 30/02 |
| | | | 705/14.66 |
| 2010/0010912 A1 | 1/2010 | Jones et al. | |
| 2011/0191417 A1 | 8/2011 | Rathod | |
| 2011/0302201 A1* | 12/2011 | Ogaz | G06Q 30/02 |
| | | | 707/769 |
| 2013/0024282 A1 | 1/2013 | Kansal et al. | |
| 2013/0097664 A1 | 4/2013 | Herz et al. | |
| 2013/0238595 A1 | 9/2013 | Weissman et al. | |
| 2013/0275957 A1* | 10/2013 | Villar | G06F 9/452 |
| | | | 717/173 |
| 2014/0129390 A1 | 5/2014 | Mauge et al. | |
| 2014/0258270 A1 | 9/2014 | Reese et al. | |
| 2014/0337098 A1 | 11/2014 | Ganesh et al. | |
| 2014/0337936 A1 | 11/2014 | Beck | |
| 2015/0154519 A1* | 6/2015 | Doolan | G06Q 10/063 |
| | | | 705/7.11 |
| 2015/0278906 A1* | 10/2015 | Navani | G06Q 30/0631 |
| | | | 705/26.7 |
| 2017/0083940 A1* | 3/2017 | Achan | G06Q 30/0255 |

OTHER PUBLICATIONS

Ratcliff, "How fashion commerce retailers can reduce online returns" consultancy.com, Jun. 17, 2014, document of 8 pages. hhttps://econsultancy.com/blog/65026-how-fashion-ecommerce-retailers-can-reduce-online-returns/.

Pierrepont, "Amongst Promises of a Perfect Fit, What Fits and What Doesn't?" www.businessoffashion.com, Dec. 19, 2012, document of 4 pages. http://www.businessoffashion.com/articles/fashion-tech/fashion-2-0-amongst-promises-of-a-perfect-fit-what-fits-and-what-doesnt.

Psdcenter, "Faceted Search: Advanced Product Filtering for Bigcommerce Stores" www.psdcenter.com, Jan. 23, 2015, document of 3 pages. http://www.psdcenter.com/blog/advanced-product-filtering-bigcommerce-stores/.

* cited by examiner

MITIGATION METHOD, SYSTEM AND NON-TRANSITORY COMPUTER-READABLE DEVICE

FIELD OF THE INVENTION

The present application relates to mitigation technologies, device interoperability technologies, virtual assistant technologies, and more particularly, to a system and method for providing mitigation of returns.

BACKGROUND

In today's society, users are increasingly utilizing network and other service providers to gain access to the Internet, place internet-based calls, access software services, request and receive various types of content, access software applications, purchase products and services, and perform a variety of other tasks and functions. For example, many users regularly utilize network providers to gain access to online portals of various companies so as to order various types of goods and services for themselves or others. As such users have become more comfortable with technology in terms of performing their daily tasks, such users have increasingly demanded and required faster and more efficient access to the goods and services that they order. As a result, companies have provided faster and more efficient access to such goods and services through the use of various customized types of mobile applications that execute directly on smartphone devices or other mobile devices.

Even though users are equipped with faster and more efficient access to such goods and services than ever before, goods and services that are ordered using current technologies are often returned at a rate that is not desirable or optimal. For example, "instant buy" orders or other types of "instant gratification" orders have promoted impulse buys from users for goods and services that are not necessarily compatible with such users in a variety of ways. This often increases user unhappiness, not only with the goods and services that were ordered, but also with the ordering process itself. As a result, current methodologies and technologies may be modified so as to provide enhanced quality-of-service for users and companies. Such enhancements and improvements to methodologies and technologies may provide for improved customer satisfaction, increased revenue for companies, and increase functionality for both users and companies.

SUMMARY

A system and accompanying methods for providing mitigation of returns are disclosed. In particular, the system and methods may include applying one or more filters to an order for an item so as to reduce the likelihood that an item will be returned by a user. In order to accomplish the foregoing, the system and methods may include receiving, from a first device of a user, a first order for a first item. Upon receiving the first order, the system and methods may include applying one or more filters to the order to determine if the first item is compatible with the user, the user's devices, the user's preferences, the user's existing items, the user's other orders, the user's accounts, or any combination thereof. For example, the system and methods may apply a user profile filter to compare the first item to preferences and information listed in a user profile of the user to determine whether the first item is compatible with the user profile. As another example, the system and methods may apply an interoperability filter to the order to determine if the first item is interoperable with other devices that the user owns. Once the one or more filters are applied to the first order for the first item, the system and methods may include determining whether a conflict has been detected between the first item and the user, the user's devices, the user's preferences, the user's existing items, the user's other orders, the user's accounts, or any combination thereof. If a conflict has been detected based on application of the filters, the systems and methods may include notifying the user of the conflict. The notification, for example, may indicate that the first item should be replaced with a second item that is entirely different from the first item or a different version of the first item, and that the first order is going to be adjusted accordingly.

Based on detection of the conflict, the systems and methods may include proceeding to adjust the first order for the first item to generate a second order for a second item that is determined to be compatible with the user, the user's devices, the user's preferences, the user's existing items, the user's other orders, the user's accounts, or any combination thereof. The second order may be presented to the user, and, in certain embodiments, may be sent to a virtual assistant or person for approval prior to the second order being completed. If the virtual assistant and/or person approve the second order, the order may be completed and the second item may be sent to the user. Notably, the functionality provided by the systems and methods, along with the use of the virtual assistant and/or person to provide approval, may reduce the likelihood that the user returns an ordered item. As a result, the functionality provided by the systems and methods ensure greater user satisfaction with the ordering process and the ordered item itself. Additionally, the systems and methods ensure that "instant buy" experiences remain possible for users. Furthermore, the systems and methods enable product manufacturers and retailers to obtain greater levels of user feedback on items that are not ultimately ordered, on items that are being replaced by a new item, or a combination thereof. Moreover, the systems and methods further promote a unique ordering process that generates more return customers for companies.

In one embodiment, a system for providing mitigation of returns is disclosed. The system may include a memory that stores instructions and a processor that executes the instructions to perform various operations of the system. The system may perform an operation that includes receiving, from a first device of a user, a first order associated with a first item. After receiving the first order associated with the first item, the system may perform an operation that includes applying, by utilizing a conflict engine, a first filter to the first order associated with the first item to mitigate a return from the user. In certain embodiments, the first filter may be an interoperability filter for determining whether the first item is compatible with a second device detected on a network associated with the first device of the user. Other types of filters may be used instead of the interoperability filter or in combination with the interoperability filter. Based on applying the first filter and by utilizing the conflict engine, the system may perform an operation that includes detecting that a first conflict exists between the first item and the second device if the first item is determined to not be compatible with the second device. The system may then perform an operation that includes adjusting, based on detecting the first conflict, the first order associated with the first item to generate a second order associated with a second item that is determined to be compatible with the second device detected on the network associated with the first device of the user.

In another embodiment, a method for providing mitigation of returns is disclosed. The method may include utilizing a memory that stores instructions, and a processor that executes the instructions to perform the various functions of the method. In particular, the method may include receiving, from a first device of a user, a first order associated with a first item. Additionally, the method may include applying, by utilizing a conflict engine, a first filter to the first order associated with the first item to mitigate a return from the user. In certain embodiments, the first filter may be an interoperability filter for determining whether the first item is compatible with a second device detected on a network associated with the first device of the user. Other types of filters may be used instead of the interoperability filter or in combination with the interoperability filter. The method may then include detecting, based on applying the first filter and by utilizing the conflict engine, that a first conflict exists between the first item and the second device if the first item is determined to not be compatible with the second device. Furthermore, the method may include generating, based on detecting the first conflict, a second order associated with a second item that is determined to be compatible with the second device detected on the network associated with the first device of the user. Moreover, the method may include transmitting the second order associated with the second item to the first device.

According to yet another embodiment, a computer-readable device having instructions for providing mitigation of returns is provided. The computer instructions, which when loaded and executed by a processor, may cause the processor to perform operations including: receiving, from a first device of a user, a first order associated with a first item; applying, by utilizing a conflict engine, a first filter to the first order associated with the first item to mitigate a return from the user, wherein the first filter comprises an interoperability filter for determining whether the first item is compatible with a second device; detecting, based on applying the first filter and by utilizing the conflict engine, that a first conflict exists between the first item and the second device if the first item is determined to not be compatible with the second device; adjusting, based on detecting the first conflict, the first order associated with the first item to generate a second order associated with a second item that is determined to be compatible with the second device; and transmitting the second order associated with the second item to the first device.

These and other features of the systems and methods for providing mitigation of returns are described in the following detailed description, drawings, and appended claims.

DETAILED DESCRIPTION OF THE INVENTION

Figure 1:
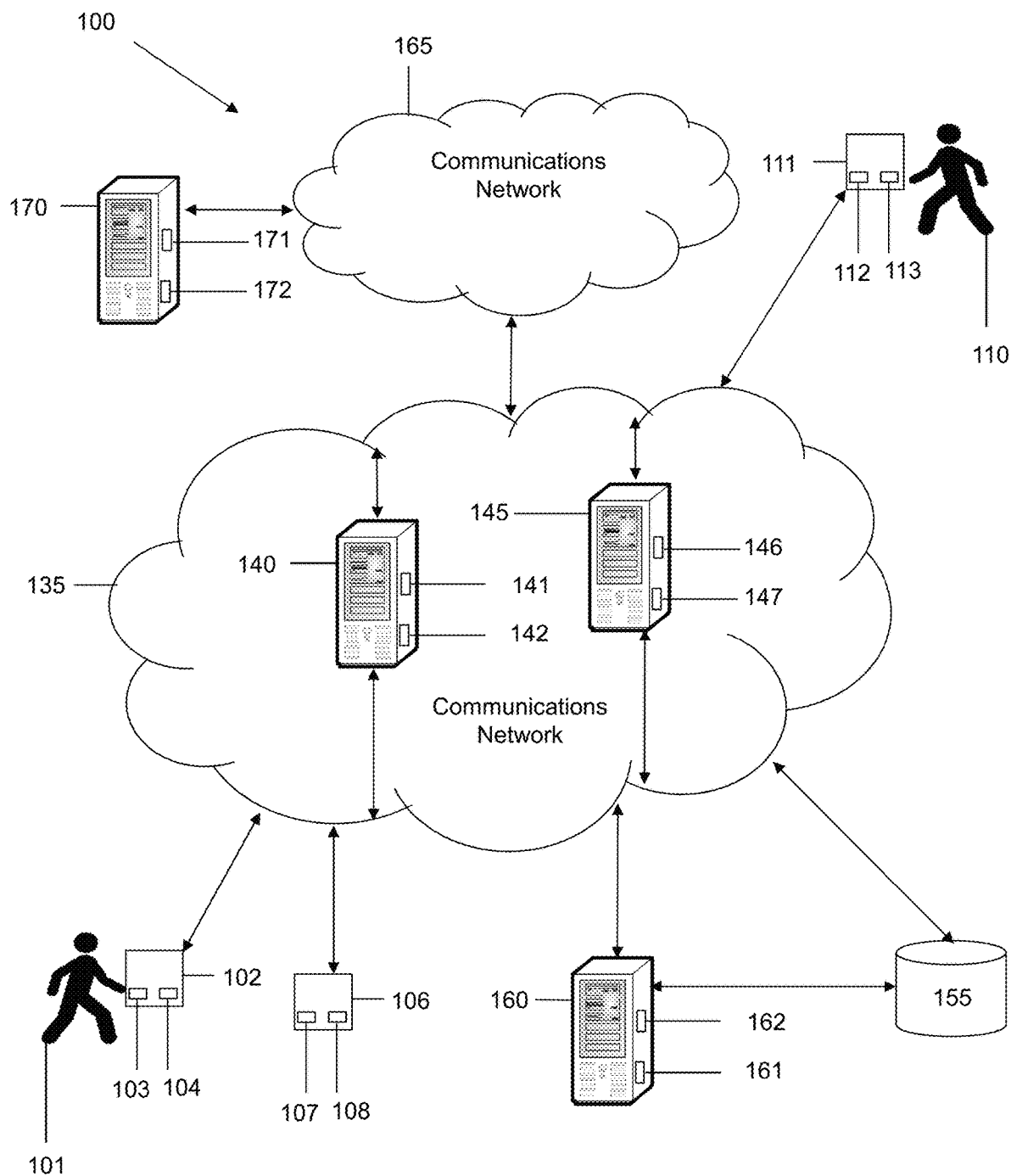
FIG. 1 is a schematic diagram of a system for providing mitigation of returns according to an embodiment of the present disclosure.

A system 100 and accompanying methods for providing mitigation of returns are disclosed. In particular, the system 100 and methods may include applying one or more filters to an order for an item so as to reduce the likelihood that an item will be returned by a user. In order to accomplish the foregoing, the system 100 and methods may include receiving, from a first user device 102 of a user, a first order for a first item. Upon receiving the first order, the system 100 and methods may include applying one or more filters to the order to determine if the first item is compatible with the user, the user's devices, the user's preferences, the user's existing items, the user's other orders, the user's accounts, or any combination thereof. For example, the system 100 and methods may include applying a user profile filter to compare the first item to preferences and information listed in a user profile of the user to determine whether the first item is compatible with the user profile. As another example, the system 100 and methods may include applying an interoperability filter to the first order to determine if the first item is interoperable with other devices that the user owns or is otherwise associated with, such as the first user device 102. As a further example, the system 100 and methods include applying a measurement filter to determine if the first item has a size and a weight that is compatible with existing equipment of the user.

Once the one or more filters are applied to the first order for the first item, the system 100 and methods may include determining whether a conflict exists between the first item and the user, the user's devices, the user's preferences, the user's existing items, the user's other orders, the user's accounts, or any combination thereof. If a conflict has been determined to exist based on the application of the filters, the system 100 and methods may include notifying the user of the conflict. In certain embodiments, the notification may indicate that the first item will be replaced with a second item that is entirely different from the first item or a different version of the first item, and that the first order is going to be adjusted accordingly. The system 100 and methods may then include adjusting the first order for the first item to generate a second order for a second item that is determined to be compatible with the user, the user's devices, the user's preferences, the user's existing items, the user's other orders, the user's accounts, or any combination thereof. The second order may then be presented to the user, and, the second order may be sent to a virtual assistant and/or an actual person for approval prior to the second order being completed. If the virtual assistant and/or person approve the second order, the order may be completed and the second item may be sent to the user.

Based on the foregoing, the system 100 and methods may reduce the likelihood that the user would return an ordered item. As a result, the functionality provided by the system 100 and methods ensure greater user satisfaction with the ordering process and the ordered item itself. Additionally, the system 100 and methods ensure that "instant buy" experiences remain possible for users, and enable product manufacturers and retailers to obtain greater levels of user feedback on items that are not ultimately ordered, on items that are being replaced by a new item, or a combination thereof. Moreover, the system 100 and methods provide a unique ordering process that may generate more return customers for companies that provide various products and services for order.

Figure 2:
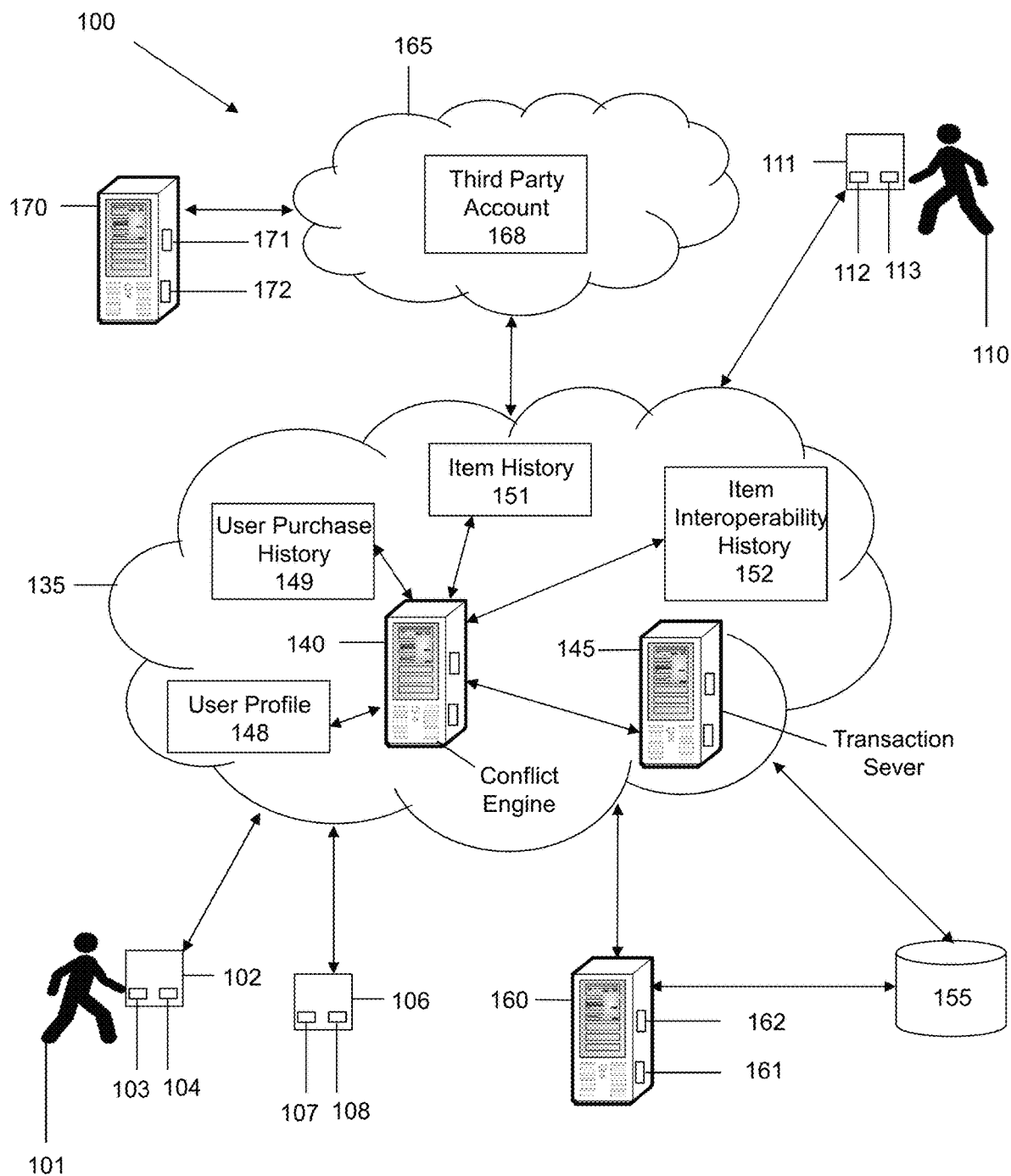
FIG. 2 is a schematic diagram illustrating further components of the system of FIG. 1.

As shown in FIGS. 1-2, a system 100 for providing mitigation of returns is disclosed. The system 100 may be configured to support, but is not limited to supporting, content delivery services, cloud computing services, IP Multimedia Subsystem (IMS) services, satellite services, telephone services, voice-over-internet protocol services (VoIP), voice-over-long-term-evolution (VoLTE) services, software as a service (SaaS) applications, gaming applications and services, social media applications and services, operations management applications and services, productivity applications and services, mobile applications and services, and any other computing applications and services. The system may include a first user 101, who may utilize a first user device 102 to access data, content, and services, or to perform a variety of other tasks and functions. As an example, the first user 101 may utilize first user device 102 to transmit signals to access various online services and content, such as those provided by a content provider or service provider associated with communications network 135. As another example, the first user 101 may utilize first user device 102 to make one or more online orders for goods and services from an online portal hosted by the communications network 135. In certain embodiments, the first user 101 may be a subscriber of a service provider that controls communications network 135. The first user device 102 may include a memory 103 that includes instructions, and a processor 104 that executes the instructions from the memory 103 to perform the various operations that are performed by the first user device 102. In certain embodiments, the processor 104 may be hardware, software, or a combination thereof. In certain embodiments, the first user device 102 may be a computer, a laptop, a set-top-box, a tablet device, a phablet, a server, a mobile device, a smartphone, a smart watch, or any other type of computing device. Illustratively, the first user device 102 is shown as a smartphone device in FIGS. 1-2.

The first user 101 may also have a second user device 106, which may include similar functionality and features as provided by first user device 102. For example, the second user device 106 may also be utilized to transmit signals to access various online services and content, such as via communications network 135. The second user device 106 may include a memory 107 that includes instructions, and a processor 108 that executes the instructions from the memory 107 to perform the various operations that are performed by the second user device 106. In certain embodiments, the processor 108 may be hardware, software, or a combination thereof. In certain embodiments, the second user device 106 may be a computer, a laptop, a set-top-box, a tablet device, a phablet, a server, a mobile device, a smartphone, a smart watch, or any other type of computing device. Illustratively, the second user device 106 is shown as a tablet device in FIGS. 1-2. Notably, however, in certain embodiments, the second user device 106 may not be a computing device, but may be any type of object, product, or a combination thereof.

In addition to the first user 101, the system 100 may also include a second user 110, who may utilize a third user device 111 to perform a variety of functions. For example, the third user device 111 may be utilized by the second user 110 to transmit signals to request various types of content, services, and data provided by content and service providers associated with the communications network 135 or any other network in the system 100. Also, the second user 110 may utilize third user device 111 to make one or more online orders for goods and services from an online portal hosted by the communications network 135. In certain embodiments, the third user device 111 may be utilized by the second user 110 to analyze an order made by the first user 101, approve or reject an order made by the first user 101, or a combination thereof. In certain embodiments, the second user 110 may be a subscriber of a service provider that controls communications network 135. The third user device 111 may include a memory 112 that includes instructions, and a processor 113 that executes the instructions from the memory 112 to perform the various operations that are performed by the third user device 111. In certain embodiments, the processor 113 may be hardware, software, or a combination thereof. Similar to the first user device 102, in certain embodiments, the third user device 111 may be a computer, a laptop, a tablet device, a phablet, a server, a mobile device, a smartphone, a smart watch, or any other type of computing device. Illustratively, the third user device 111 is shown as a computer in FIGS. 1-2.

In certain embodiments, first user device 102, the second user device 106, and the third user device 111 may have any number of software applications and/or application services stored and/or accessible thereon. For example, the first, second, and third user devices 102, 106, 111 may include cloud-based applications, VoIP applications, other types of phone-based applications, product-ordering applications, business applications, e-commerce applications, media streaming applications, content-based applications, media-editing applications, database applications, gaming applications, internet-based applications, browser applications, mobile applications, service-based applications, productivity applications, video applications, music applications, social media applications, any other type of applications, any types of application services, or a combination thereof. In certain embodiments, the software applications and services may include one or more graphical user interfaces so as to enable the first and second users 101, 110 to readily interact with the software applications. The software applications and services may also be utilized by the first and second users 101, 110 to interact with the any device in the system 100, any network in the system 100, or any combination thereof. In certain embodiments, the first user device 102, the second user device 106, and the third user device 111 may include associated telephone numbers, device identities, or any other identifiers to uniquely identify the first, second, and third user devices 102, 106, 111.

The system 100 may also include a communications network 135. The communications network 135 of the system 100 may be configured to link each of the devices in the system 100 to one another. For example, the communications network 135 may be utilized by the first user device 102 to connect with other devices within or outside communications network 135. Additionally, the communications network 135 may be configured to transmit, generate, and receive any information and data traversing the system 100. In certain embodiments, the communications network 135 may include any number of servers, databases, or other componentry, and may be controlled by a service provider. In certain embodiments, the communications network 135 may be subscribed to by a company, the first and second users 101, 110, or a combination thereof. The communications network 135 may also include and be connected to a cloud-computing network, an IMS network, a VoIP network, a VoLTE network, a wireless network, an Ethernet network, a satellite network, a broadband network, a cellular network, a private network, a cable network, the Internet, an internet protocol network, a multiprotocol label switching (MPLS) network, a content distribution network, any network, or any combination thereof. Illustratively, servers 140 and 145 are shown as being included within communications network 135. In certain embodiments, the server 140 may serve as a conflict engine for detecting conflicts for the system 100, and the server 145 may serve as a transaction server for processing transactions for the system 100. In certain embodiments, the communications network 135 may be part of a single autonomous system that is located in a particular geographic region, or be part of multiple autonomous systems that span several geographic regions.

Notably, the functionality of the system 100 may be supported and executed by using any combination of the servers 140, 145, 160, and 170. As mentioned above, servers 140 and 145 may serve as a conflict engine and a transaction server respectively. The servers 140 and 145 may reside in communications network 135, however, in certain embodiments, the servers 140, 145 may reside outside communications network 135. In certain embodiments, the server 140 may include a memory 141 that includes instructions, and a processor 142 that executes the instructions from the memory 141 to perform various operations that are performed by the server 140. The processor 142 may be hardware, software, or a combination thereof. Similarly, the server 145 may include a memory 146 that includes instructions, and a processor 147 that executes the instructions from the memory 146 to perform the various operations that are performed by the server 145. In certain embodiments, the servers 140, 145, 160, and 170 may be network servers, routers, gateways, switches, media distribution hubs, signal transfer points, service control points, service switching points, firewalls, routers, edge devices, nodes, computers, mobile devices, or any other suitable computing device, or any combination thereof. In certain embodiments, the servers 140, 145 may be communicatively linked to the communications network 135, the communications network 165, any network, any device in the system 100, or any combination thereof.

The database 155 of the system 100 may be utilized to store and relay information that traverses the system 100, cache content that traverses the system 100, store data about each of the devices in the system 100 and perform any other typical functions of a database. In certain embodiments, the database 155 may be connected to or reside within the communications network 135, the communications network 165, any other network, or a combination thereof. In certain embodiments, the database 155 may serve as a central repository for any information associated with any of the devices and information associated with the system 100. Furthermore, the database 155 may include a processor and memory or be connected to a processor and memory to perform the various operation associated with the database 155. In certain embodiments, the database 155 may be connected to the servers 140, 145, 160, 170, the first user device 102, the second user device 111, any devices in the system 100, any other device, any network, or any combination thereof.

The database 155 may also store information and metadata obtained from the system 100, store metadata and other information associated with the first and second users 101, 110, store user profiles associated with the first and second users 101, 110, store device profiles associated with any device in the system 100, store communications traversing the system 100, store user preferences, store information associated with any device or signal in the system 100, store information relating to patterns of usage relating to the first, second, and third user devices 102, 106, 111, store any information obtained from any of the networks in the system 100, store historical data associated with the first and second users 101, 110, store device characteristics, store item interoperability information and history, store history information for various types of items, products and services, store user purchase history information, store information associated with conflicts detected in the system, store information relating to any devices associated with the first and second users 10, 110, store any of the filters of the system 100, store any parameters for any of the filters of the system 100, store information associated with orders made in the system 100, store any of the information disclosed for any of the operations and functions disclosed for the system 100 herewith, store any information traversing the system 100, or any combination thereof. Furthermore, the database 155 may be configured to process queries sent to it by any device in the system 100.

In addition to communications network 135, the system 100 may also include a communications network 165. In certain embodiments, the communications network 165 may be controlled by a third party service provider, a company, or even the service provider of the communications network 135. For example, the communications network 165 may be a network that hosts functionality for various services subscribed to by the first and second users 101, 110, along with corresponding third party accounts 168 that correspond to the subscriptions. As an example, if the first user 101 utilizes a smart lighting system at his or her home, the communications network 165 may be the network of the company that controls the functionality of the smart lighting system for the first user 101. As another example, if the second user 110 utilizes a networked wireless audio system at his or her home, the communications network 165 may support the interconnection of the various speakers for the audio system and any functionality provided by the networked wireless audio system. The third party accounts 168 may include information including, but not limited to, information identifying the types of services subscribed to by the first and second users 101, 110, information identifying the types of devices of the first and second users 101, 110 that communicate using the communications network 165, information identifying the first and second users 101, 110, information identifying the components of devices of the first and second users 101, 110, information identifying products that the first and second users 101, 110 own, information identifying any type of orders for products and services made by the first and second users 101, 110, any other information, or any combination thereof.

In certain embodiments, the communications network 165 of the system 100 may be configured to link each of the devices in the system 100 to one another. Additionally, the communications network 165 may be configured to transmit, generate, and receive any information and data traversing the system 100. In certain embodiments, the communications network 165 may include any number of servers, databases, or other componentry. In certain embodiments, the communications network 165 may be subscribed to by a company, the first and second users 101, 110, or a combination thereof. The communications network 165 may also include and be connected to a cloud-computing network, an IMS network, a VoIP network, a VoLTE network, a wireless network, an Ethernet network, a satellite network, a broadband network, a cellular network, a private network, a cable network, the Internet, an internet protocol network, a MPLS network, a content distribution network, any network, or any combination thereof. Illustratively, server 170 is shown as being associated with communications network 165. In certain embodiments, the communications network 165 may be part of a single autonomous system that is located in a particular geographic region, or be part of multiple autonomous systems that span several geographic regions.

The server 170 may be utilized to perform any of the operative functions supported by the communications network 165, the system 100, or a combination thereof. For example, the server 170 may be utilized to host the third party accounts 168 associated with the first and second users 101, 110, and may be utilized to perform functions and services subscribed to by the first and second users 101, 110. The server 170 may reside in communications network 165, however, in certain embodiments, the server 170 may reside outside of communications network 165. In certain embodiments, the server 170 may include a memory 171 that includes instructions, and a processor 172 that executes the instructions from the memory 171 to perform various operations that are performed by the server 170. The processor 172 may be hardware, software, or a combination thereof. In certain embodiments, the server 170 may be a network server, router, gateway, switch, media distribution hub, signal transfer point, service control point, service switching point, firewall, router, edge device, node, computer, mobile device, or any other suitable computing device, or any combination thereof. In certain embodiments, the server 170 be communicatively linked to the communications network 135, any network, any device in the system 100, or any combination thereof.

Operatively, the system 100 may provide mitigation of returns, as shown in the following exemplary scenarios. In a first scenario and referring to FIGS. 1-2, the first user 101 may transmit, by utilizing the first user device 102, a request to order a wireless speaker to utilize with an existing wireless audio system (e.g. second user device 106) that the first user 101 has at his home. The first user 101 may send the request by utilizing an application executing on the first user device 102 that interacts with the system 100. In certain embodiments, the application may be controlled by a company that is selling various products for purchase to various users accessing the application. The request may be received by a transaction server, such as server 145, via the application. The transaction server may then forward the request to the conflict engine (e.g. server 140) to determine if the particular wireless speaker ordered by the first user 101 is compatible with the first user 10, the first user's 101 devices, the first user's 101 preferences, the first user's 101 existing items, the first user's 101 other orders, the first user's accounts, or any combination thereof.

In order to determine whether the ordered wireless speaker is compatible with the first user 101, the first user's 101 devices, the first user's 101 preferences, the first user's 101 existing items (e.g. second user device 106, electronic devices or any type of object), the first user's 101 other orders, the first user's 101 accounts, or any combination thereof, the conflict engine may apply one or more filters to the order made by the first user 101. In certain embodiments, a filter may be program including one or more parameters and/or rules that may be utilized to identify and verify whether a particular ordered item matches or otherwise corresponds to the parameters and/or rules of the filter. Also, in certain embodiments, a filter may be a function or subroutine accessible by the conflict engine that includes one or more parameters and/or rules to identify and verify whether an ordered item matches or corresponds to the parameters and/or rules. In certain embodiments, the filter may be applied not only to the order made by the first user 101, but also may be applied to any information or preferences input by the first user 101 into the application controlled by the company or otherwise.

Notably, any type of filter may be applied, and any number of filters may be applied to the order made by the first user 101. As a first example, the conflict engine may employ the use of a user profile filter that may be utilized to compare information present in the user's profile 148 to the characteristics of the ordered wireless speaker to determine if the ordered wireless speaker is compatible with the information in the user profile 148. As an example, if the user profile 148 indicates that the first user 101 has a preference for speakers that only output sound at a certain threshold decibel level or lower, the user profile filter may be utilized by the conflict engine to determine that the ordered wireless speaker outputs sound at a decibel level that is higher than the threshold decibel level specified in the user profile 148. The user profile 148 may include any type of information associated with the first user 101 (or any other user). In certain embodiments, the user profile 148 may include, but is not limited to including, the first user's name, address information for the first user 101, a listing of all devices and/or property of the first user 101, internet protocol address for devices of the first user 101, an identification of preferences of the first user 101, demographic information associated with the first user 101, health/medical/prescription information for the first user 101, contact information for the first user 101, a listing of third party accounts 168 associated with the first user 101, access history associated with the first user's 101 access of the application controlled by the company, a user name and password for logging into the application, biological measurements of the first user 101 (e.g. height, weight, size, dimensions, etc.), any type of information, or any combination thereof. The preferences listed in the user profile 148 may include, but are not limited to, color preferences, manufacturer preferences, brand preferences, size preferences, functionality preferences, device preferences, feature preferences, any type of preferences, or any combination thereof.

As a second example, the conflict engine may utilize an order/purchase history filter to determine whether the ordered wireless speaker is compatible with items that the first user 101 has previously ordered in the past. If, for example, the first user 101 previously purchased his wireless audio system using the application, the order/purchase history filter may be utilized to access the first user's 101 purchase history 149 to determine whether the wireless audio system and the ordered wireless speaker are compatible with each other based on their technical specifications and other characteristics. The purchase history 149 may include, but is not limited to including, purchase date information, price information, technical specifications for a product or service purchased, manufacturer information for a product purchased, compatibility information, any information, or a combination thereof. If, for example, the conflict engine determines that wireless audio system previously purchased by the first user 101 is made by a different manufacturer than the wireless speaker that the first user 101 is currently ordering, the conflict engine may determine that the ordered wireless speaker is not compatible with the previously purchased wireless audio system.

As a third example, the conflict engine may utilize an item history filter to determine whether the wireless speaker ordered by the user is the same model as a previously purchased speaker, a new version of a previously purchased speaker, or a different version of a previously purchased speaker. The item history filter may be utilized to access an item history 151 that may include information for a previously purchased speaker, a different version of a previously purchased speaker, and/or the wireless speaker currently being ordered. The item history 151 may include technical specification information for an ordered item, information associated with different versions of a particular product, information associated with upgraded versions of a particular product, feedback information, manufacturer information, any other information, or a combination thereof. In certain embodiments, the item history 151 may also indicate a rate of return for a particular item, a feedback score for an item, or any combination thereof. The feedback score may be a numeric score given to a particular item based on positive reviews, negative reviews, any type of review, or any combination thereof. A high score may be indicative of a high quality and/or well-liked product, and a low score may be indicative of a low quality and/or disliked product.

As a fourth example, the conflict engine may utilize an interoperability filter to determine if the ordered wireless speaker is technically compatible with another device of the user, such as second user device 106. For example, since the first user's 101 order was for a wireless speaker, the system 100 may utilize the interoperability filter to determine if the specifications for the wireless speaker are compatible with the technical specifications of the wireless audio system that the first user 101 already owns. The interoperability filter may be utilized to access an item interoperability history 152 that may include information associated with a device, such as, but not limited to, operating system information for the device, information identifying the types of communication ports the device has, information identifying the types of charging ports the device has, information identifying the types of connection cables (e.g. power cables, data transfer cables, etc.) the devices uses, information identifying the communications protocols that the device uses, information identifying the components and hardware that the device has, information identifying the type of software running on the device, information identifying the types of software the device is compatible with, information identifying what types of devices the device is compatible with, any other information, or any combination thereof. If the conflict engine determines that the ordered wireless speaker utilizes a communication protocol that is not compatible with the communication protocol utilized by the wireless audio system, the conflict engine may determine the incompatibility based on application of the interoperability filter.

As a fifth example, the conflict engine may utilize a color filter to determine if a color of the ordered wireless speaker appropriately matches or is compatible with the color of the wireless audio system or other wireless speakers that the first user 101 owns. For example, if the wireless audio system is green and the ordered wireless speaker is red, the conflict engine may determine that the colors of the two items are not compatible. As a sixth example, the conflict engine may utilize a user account filter determine if the ordered wireless speaker is compatible with one or more user accounts 168 (e.g. associated with third parties) associated with the first user 101. For example, the manufacturer of the wireless audio system may have a specialized network (e.g. communications network 165) that controls various functional features and connectivity options of the wireless audio system. The first user 101 may have a user account with the manufacturer that specifies the types of services subscribed to by the first user 101, the types of communications protocols associated with the specialized network, the types of devices that are authorized to communicate with the specialized network, the components of devices that communicate with the specialized network, any other information, or any combination thereof. In certain embodiments, the user account 168 may indicate which devices of the first user 101 are active (e.g. which devices are turned on, which devices are currently being used, which devices are connected to the communications network 165, which devices are detected on the communications network 135, which devices will be used, or which devices are fully functioning) and which devices are inactive (e.g. which devices are turned off, which devices are not connected to the communications network 165, which devices are detected on the communications network 135, which devices are no longer being used, which devices are broken, or which devices are disabled). If, for example, a device is inactive, the filter may not factor that particular device when determining compatibility with an ordered item. By applying the user account filter, the conflict engine may determine if the ordered wireless speaker is not compatible with the requirements and information found in the user account 168 of the first user 101.

As a seventh example, the conflict engine may utilize a measurement filter to determine if the dimensions (e.g. size measurements) of the ordered wireless speaker are compatible with the first user 101 himself and/or with devices and/or other items of the first user 101. For example, the dimensions may pertain to the ordered wireless speaker, the user, the user's other devices, and the user's other items, and may include, but are not limited to, a height dimension, a length dimension, a width dimension, a weight, a size dimension, any type of physical measurement that may be associated with an item, or any combination thereof. In certain embodiments, the measurement filter may take into account the user's body measurements as well. If, for example, the conflict engine determines that the dimensions of the ordered wireless speaker are too large to fit within the space dimensions of a cabinet owned by the user, the conflict engine may determine that the ordered wireless speaker is not compatible with the first user's 101 cabinet. Notably, any type of conceivable filter may be utilized by the system 100 to determine any type of compatibility with the user, the user's devices, the user's preferences, the user's items, or any combination thereof. Additionally, any of the filters may be combined, and any of the rules, parameters, and information associated with one filter may be shared with another filter and vice versa.

Once the one or more filters are applied to the order made by the first user 101, the conflict engine may proceed to detect whether any conflict exists between the ordered wireless speaker and the first user 101, the first user's 101 devices, the first user's 101 preferences, the first user's 101 existing items (e.g. electronic devices or any type of object), the first user's 101 other orders, the first user's 101 accounts 168, or any combination thereof. If there is no conflict detected, the system 100 may transmit instructions to the transaction server in the system 100 to finalize and complete the order for the wireless speaker and cause the ordered wireless speaker to be shipped to the first user 101. If, however, there are one or more conflicts detected based on the application of the filters, the system 100 may transmit a notification to the first user device 102 of the first user 101 that that identifies the conflict to the first user 101. The notification may be transmitted by utilizing the conflict engine. In certain embodiments, the notification may be presented on a graphical user interface of the first user device 102. The notification may indicate the specific incompatibilities and conflicts detected by the system 100.

For example, the notification may indicate the specific incompatibilities between the ordered wireless speaker and the wireless audio system that the first user 101 already owns.

Once one or more conflicts are detected, the system 100 may adjust the first order associated with ordered wireless speaker to generate a second order associated with a different wireless speaker that is determined to be compatible with the first user 101, the first user's 101 devices, the first user's 101 preferences, the first user's 101 items, the first user's 101 accounts, or any combination thereof. When adjusting the first order, the system 100 may automatically search the database 155 or other data repositories for other items including components, features, functions that would be compatible with the first user 101, the first user's 101 devices, the first user's 101 preferences, the first user's 101 items, the first user's 101 accounts, or any combination thereof. For example, using the example above, the system 100 may locate a different wireless speaker that is made by the same manufacturer that made the wireless audio system and includes ports that are compatible with the wireless audio system. In certain embodiments, the system 100 may replace the first order with the second order so that only the compatible wireless speaker is ordered, or the system 100 may add the second order to the first order so that both items may be ordered.

The system 100 may then determine if the first order and/or the second order need further approval before either order, or both, are completed. If an order does not need further approval before completing the order, the order may then be finalized and completed, and any ordered speakers may be sent to the first user 101. If, however, approval is needed before completing the order, the system 100 may transmit the order to a virtual assistant (e.g. a program running on server 160), to an actual person (e.g. second user 110 who may be a fashion consultant, design consultant, electronics expert, etc.), or combination thereof, for further approval. The virtual assistant may be a program (or set of programs) that is configured to further filter or analyze an order to ensure compatibility for the first user 101. In certain embodiments, the virtual assistant may be hosted by and its accompanying functions may be performed by utilizing the server 160 or another appropriate device.

The virtual assistant may be equipped with various types of artificial intelligence abilities, positive preferences of the user (e.g. what the first user 101 prefers), negative preferences of the user (e.g. what the first user 101 does not want), historical information associated with items that may be ordered, feedback/reviews for items that may be ordered, any other information or a combination thereof. The virtual assistant (or the actual person) may be granted access to all or a subset of information associated with the first user 101, such as, but not limited to, the user purchase history 149, the item history 151, the item interoperability history 152, the user profile 148, any inputs (e.g. preferences) made by the first user 101 into the system 100, information associated with items of the first user 101, information associated with devices of the first user 101, information associated with networks subscribed to by the first user 101, any information associated with the first user 101, or any combination thereof. Any of the information that is made accessible to the virtual assistant may be utilized to determine whether the order should be approved.

The system 100 may then determine if the first order and/or second order have been approved by the virtual assistant, the actual person, or both. If the virtual assistant does not approve the first order and/or second order, the system 100 may reject the first order and/or second order. If the first order and/or second order are rejected, the order may not be completed and the first user 101 may be prompted to attempt to make a new order for a new speaker, override the rejection, or perform another action relating to the order. If, however, the first order and/or second order have been approved by the virtual assistant and/or the person, the system 100 may complete the order so that the appropriate wireless speaker(s) may be transmitted and/or shipped to the user.

Notably, the system 100 may be utilized to facilitate the ordering process for any other conceivable scenario. For example, the system 100 may be utilized to determine if an ordered clothing item aligns with a user's size dimensions (e.g. height, weight, etc.). Additionally, the system 100 may determine that although the particular clothing item is the right size (e.g. medium) that the user normally orders for himself, that the ordered medium clothing item of the particular manufacturer runs larger than medium clothing items for other manufacturers that the user has previously ordered from. In such a scenario, the system 100 may adjust the order for the medium clothing item and replace the order with an order for a small clothing item for that particular manufacturer, and then present the revised order to the user. As another example, the system 100 may detect that a past purchase from a particular manufacturer was a size 6 clothing item, and that the ordered clothing item is a size 4. Based on the foregoing, the system 100 may transmit a notification to the user that inquires whether or not the user would like to purchase the size 4 clothing item, or, instead, a size 6 version of the clothing item, or both.

In certain embodiments, the system 100 may be utilized to determine if the ordered item is the correct color that the user really wants. For example, a photo of the user may be uploaded into the system 100 by the user, and, by utilizing the color filter and/or user profile filter on the photo, the system 100 may determine that an ordered item does not match the user's skin tone. In such a scenario that system 100 may advise the user of the mismatch and even generate an image of the user wearing the ordered item to show the mismatch to the user. The system 100 may also generate an image of the user wearing a different color clothing item that has been determined to be compatible with the user's skin tone. The system 100 may also determine whether the ordered item is compatible with previously purchased clothing items, such as by accessing the user profile 148, the purchase history 149, photos, videos, and content on social media pages of the user, photo albums of the user, videos of the user, or a combination thereof. In another embodiments, the system 100 may determine if an ordered item is compatible with other items also being ordered in the user's electronic shopping cart.

In certain embodiments, the system 100 may also be utilized to determine if the ordered item works with various electronics that the user already has. For example, the system 100 may determine whether or not an ordered television is compatible with a universal remote that the user already has. As another example, the system 100 may determine whether the ordered item is compatible with the user's accounts 168, such as, but not limited to, accounts associated with smart lighting systems, audio systems, television systems, home automation systems, phone systems, any type of system, or any combination thereof. The system 100 may determine how the ordered item compares with current equipment that the user has. If the ordered item is the same as a previously purchased item, is a new version of a previously purchased item, is a competing item of a previously purchased item, the system 100 may transmit a request for feedback from the user to input a review associated with the item being replaced, an indication as to whether the item being replaced broke, and/or an indication as to a reason for replacing the item.

In further embodiments, the system 100 may determine whether the ordered item has the correct connections, components, and features to connect with the user's existing equipment. For example, the system 100 may determine if display ports are compatible between the ordered item and existing equipment, whether the ordered item and existing equipment are both HDMI compatible, whether the ordered item and existing equipment are 4K compatible, whether the ordered item and existing equipment are HTCP 2.2 compatible, or any other compatibility. The system 100 may also determine whether an ordered item has been tested and/or used with the user's current equipment. In certain embodiments, the determination may be performed by factoring the user accounts 168. The system 100 may indicate "Yes" (tested), "No" (failed), "maybe" (other people didn't return this particular product), or "maybe not" (other people have returned this particular product) on a graphical user interface of the application running on the device of the user.

In still further embodiments, the system 100 may determine whether an ordered item has a high return rate (e.g. higher than a threshold value or range), and may transmit a notification to the user advising the user of the high return rate. For example, the system may transmit a notification that indicates that the ordered item has been returned by 30% of the people who purchase it. The system may also transmit a notification that indicates the reasons why other people have returned the item. The system 100 may factor in the size and weight of the ordered item, such as by utilizing the measurement filter. For example, if the user is purchasing an action camera, the system 100 may determine that the action camera will fit the user's head and chest mount, but is too heavy for the user's drone to carry. The system 100 may transmit a request for input from the user as to whether or not to proceed with the order based on the system's 100 determinations. The system 100 may also determine whether an ordered medicine conflicts with a prescription loaded into the user profile 148 of the user. The system 100 can also determine if the item ordered conflicts with supplements that the user is taking.

Notably, as shown in FIG. 1, the system 100 may perform any of the operative functions disclosed herein by utilizing the processing capabilities of server 160, the storage capacity of the database 155, or any other component of the system 100 to perform the operative functions disclosed herein. For example, the software programs that support the virtual assistant described herein for the system 100 may execute on the server 160. The server 160 may include one or more processors 162 that may be configured to process any of the various functions of the system 100. The processors 162 may be software, hardware, or a combination of hardware and software. Additionally, the server 160 may also include a memory 161, which stores instructions that the processors 162 may execute to perform various operations of the system 100. For example, the server 160 may assist in processing loads handled by the various devices in the system 100, such as, but not limited to, receiving a first order for a first item from a first device of a user; applying one or more filters to the first order received from the first device of the user; determining whether the first item is compatible with a second device of the user; detecting whether a conflict exists based on applying the one or more filters to the first order; adjusting the first order to create a second order for a second item that is determined to be compatible with the second device; enabling a virtual assistant to approve the first order and/or second order; transmitting notifications upon the detection of a conflict; and performing any other suitable operations conducted in the system 100 or otherwise. In one embodiment, multiple servers 160 may be utilized to process the functions of the system 100. The server 160 and other devices in the system 100, may utilize the database 155 for storing data about the devices in the system 100 or any other information that is associated with the system 100. In one embodiment, multiple databases 155 may be utilized to store data in the system 100.

Although FIG. 1 illustrates a specific example configuration of the various components of the system 100, the system 100 may include any configuration of the components, which may include using a greater or lesser number of the components. For example, the system 100 is illustratively shown as including a first user device 102, a second user device 106, a third user device 111, a communications network 135, a communications network 165, a server 140, a server 145, a server 160, a server 170, and a database 155. However, the system 100 may include multiple first user devices 102, multiple second user devices 106, multiple third user devices 111, multiple communications networks 135, multiple communications networks 135, multiple servers 140, multiple servers 145, multiple servers 160, multiple servers 170, multiple databases 155, or any number of any of the other components inside or outside the system 100. Furthermore, in certain embodiments, substantial portions of the functionality and operations of the system 100 may be performed by other networks and systems that may be connected to system 100.

Figure 3:
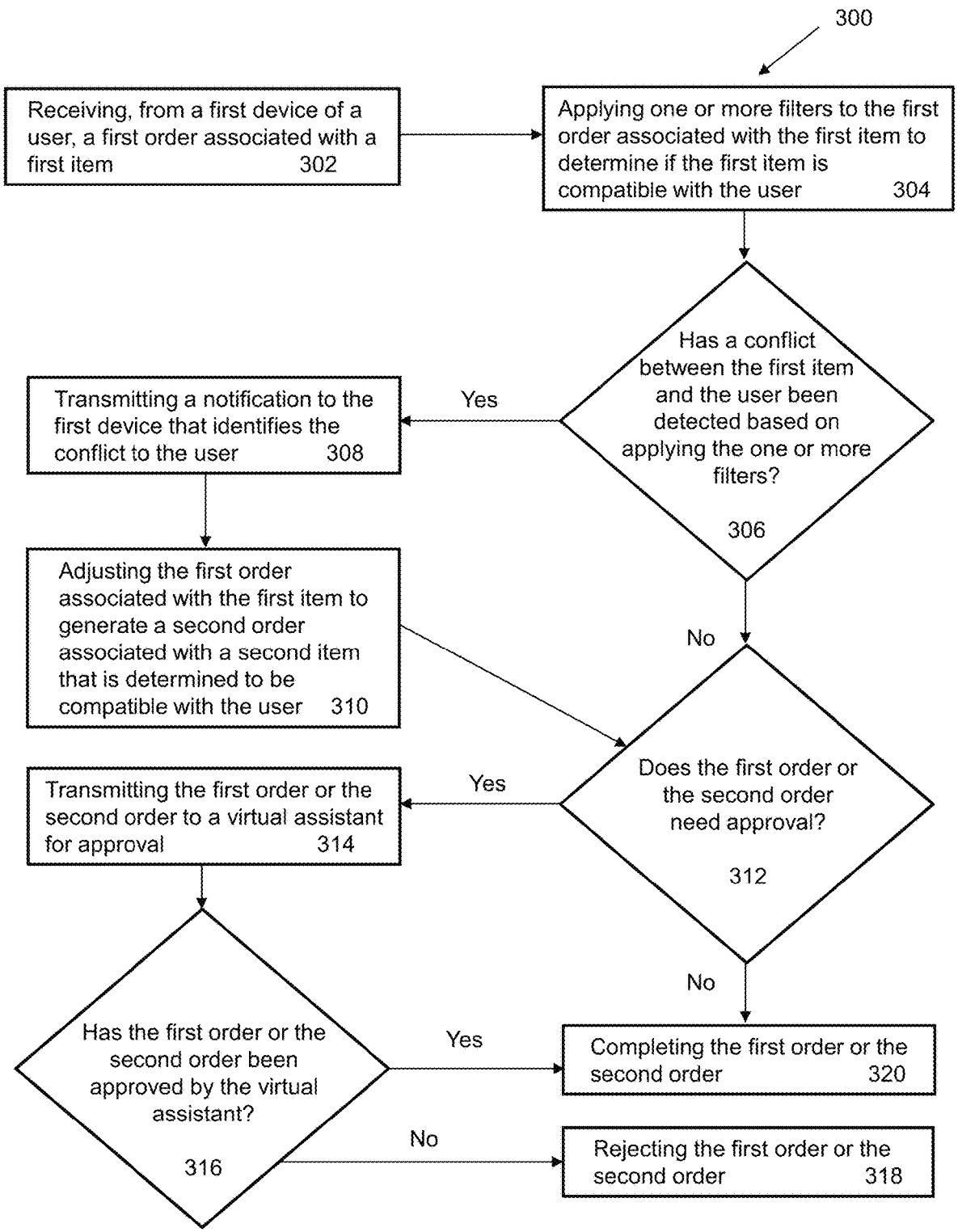
FIG. 3 is a flow diagram illustrating a sample method for providing mitigation of returns according to an embodiment of the present disclosure.

As shown in FIG. 3, an exemplary method 300 for mitigation of returns is schematically illustrated. The method 300 may include steps for reducing the likelihood of a return associated with one or more orders made by a user in accordance with the disclosure provided herein. The method 300 may include, at step 302, receiving, from a first device of a user, a first order associated with a first item. For example, the first user 101 may utilize the first user device 102 to transmit an order to purchase a smart bulb for a lighting system of the user, such as via an application executing on the first user device 102. In certain embodiments, the first order may be received and/or transmitted by utilizing the first user device 102, the second user device 106, the third user device 111, the server 140, the server 145, the server 160, the communications network 135, any combination thereof, or by utilizing any other appropriate program, network, system, or device. Once the first order is received, the method 300 may include, at step 304, applying one or more filters to the first order associated with the first item so as to determine whether the first item is compatible with the user. For example, the one or more filters may be utilized to determine whether the first item is compatible with the user's profile 148, devices, accounts, preferences, or a combination thereof. In certain embodiments, the applying of the one or more filters may be performed by utilizing the server 140, the server 145, the server 160, the communications network 135, any combination thereof, or by utilizing any other appropriate program, network, system, or device.

In certain embodiments, the filters may be applied by utilizing a software program executing on server 140, which may be a conflict engine. The filters may include, but are not limited to, an interoperability filter, a user profile filter, a color filter, a user account filter, a measurement filter, an order/purchase history filter, an item history filter, a medical filter, any type of filter, or any combination thereof. The interoperability filter may be a filter that may be utilized to determine if the first item is technically compatible with a second device or other device of the user. For example, since the first user's 101 order was for a smart bulb for the lighting system of the user, the system 100 may utilize the interoperability filter to determine if the device specifications for the smart bulb are compatible with the technical specifications of the lighting system, such as a hub of the lighting system. The interoperability filter may access an item interoperability history 152 associated with the second device or other device to perform its operations. The user profile filter may be a filter that may be utilized to compare information present in the user's profile 148 to the characteristics of the first item to determine if the first item is compatible with the information in the user profile. For example, if the user profile 148 indicates that the user lives in a location that is typically overcast, the user profile filter may determine that the smart bulb ordered by the user may have a lumen specification that is below a required threshold to adequately light the user's home.

The color filter may be utilized to determine if a color of the first item appropriately matches or is compatible with colors of other items associated with the user. For example, if the system 100 includes a list of items that are in a living room of the user, and the items are brown in color, then the color filter may be utilized to determine that the color of the smart bulb that the user ordered does not match the brown items in the living room of the user. The user account filter may be utilized to determine if the first item that was ordered is compatible with information in one or more user accounts 168 (e.g. associated with third parties) associated with the user. For example, if the first user 101 has a smart lighting system provided by a certain manufacturer, the manufacturer may include a specialized network that controls the functionality of the smart lighting system for the first user 101. The first user 101 may have a user account 168 with the manufacturer that specifies the types of services subscribed to by the first user 101, the types of wireless protocols associated with the specialized network, the types of devices that are authorized to communicate with the specialized network, the components of devices that communicate with the specialized network, any other information, or any combination thereof. In certain embodiments, the user accounts may indicate which devices of the user are active (e.g. turned on, currently being used, will be used, or fully functioning) and which devices are inactive (e.g. turned off, no longer being used, broken, or disabled). If a device is inactive, the filter may not factor that particular device when determining compatibility with an ordered item. By applying the user account filter, the system 100 may determine if the first item is not compatible with the requirements and information found in the user account 168 of the user. The system 100 may do so by linking with the databases associated with the user account 168 to access the appropriate information for the user account 168, and applying the appropriate filter(s) accordingly.

The measurement filter may be utilized to determine if the dimensions (e.g. size measurements) of the first item are compatible with the user himself and/or with devices and/or other items of the user. The dimensions may pertain to the first item, the user, devices, and other items, and may include, but are not limited to, a height dimension, a length dimension, a width dimension, a weight, a size dimension, any type of physical measurement that may be associated with an item, or any combination thereof. In certain embodiments, the measurement filter may take into account the user's body measurements as well. As an example, if the first item that the user has ordered is a camera that is to be attached to a drone that the user previously purchased, the system 100 may determine the dimensions of the camera to see if the camera has physical measurements that are small enough and light enough to be effectively attached to and carried by the drone. As another example, if the first item ordered is a shirt, the measurement filter may be utilized to determine if the dimensions of the shirt correspond to the physical measurements of the user.

The order/purchase history filter may be utilized by the system 100 to determine whether the first item is compatible with items that the user has previously ordered in the past. As an example, if the first user 101 has previously ordered a smart bulb made by a first manufacturer and the first user 101 is currently ordering a smart bulb by a second manufacturer, the order/purchase history filter may access the user's purchase history 149 to determine whether the two smart bulbs are compatible with each other based on their technical specifications and other characteristics. The item history filter may be a filter that may be utilized by the system 100 to determine whether the item ordered by the user is the same as a previously purchased item, a new version of the previously purchased item, or a different version of the previously purchased item. The item history filter may perform its analysis by accessing an item history 151 including information for the previously purchased item, the different version of the previously purchased item, and/or the item currently being ordered. The item history 151 may also indicate a rate of return for a particular item (e.g. how often the item is returned by customers), a feedback score for an item, or any combination thereof. The medical filter may be a filter that may be utilized by the system 100 to determine whether the item ordered is compatible with certain medication that the user is taking, supplements that the user is taking, health conditions that the user has, or any combination thereof. For example, if the first item that the user ordered is a certain type of supplement that causes adverse reactions when taken with a prescription medication that the user is currently taking, the system 100 may utilize the medical filter to determine the incompatibility. Notably, any type of conceivable filter may be utilized by the system 100 and method 300 to determine any type of compatibility with the user, the user's devices, the user's preferences, the user's items, or any combination thereof.

Once the one or more filters are applied, the method 300 may include, at step 306, determining if a conflict exists between the first item in the first order and the user's profile, devices, accounts, preferences, or a combination thereof. In certain embodiments, the determining may be performed by utilizing the server 140, the server 145, the server 160, the communications network 135, any combination thereof, or by utilizing any other appropriate program, network, system, or device. For example, if the first item that the first user 101 ordered is a smart bulb that is manufactured by a different manufacturer than the smart lighting system that the first user 101 currently owns, and the smart bulb is not compatible with the smart lighting system, the system 100 may determine that a conflict exists. If no conflict is determined to exist, the method 300 may proceed from step 306 to step 312 to determine whether or not the order needs further approval. If, however, there is a conflict that is determined to exist, the method 300 may include, at step 308, transmitting a notification to the first device of the user that identifies the conflict to the user. In certain embodiments, the notification may be transmitted by utilizing the server 140, the server 145, the server 160, the communications network 135, any combination thereof, or by utilizing any other appropriate program, network, system, or device. In certain embodiments, the notification may be presented on a graphical user interface of the first device, such as on a graphical user interface of the first user device 102. The notification may indicate the specific incompatibilities and conflicts detected by the system 100. For example, the notification may indicate that certain components of an ordered smart bulb do not communicate using a protocol utilized by the smart lighting system owned by the user.

At step 310, the method 300 may include adjusting the first order associated with the first item to generate a second order associated with a second item that is determined to be compatible with the user, the user's devices, the user's preferences, the user's items, or any combination thereof. In certain embodiments, the adjusting may be performed by utilizing the server 140, the server 145, the server 160, the communications network 135, any combination thereof, or by utilizing any other appropriate program, network, system, or device. When adjusting the first order, the system 100 may automatically search the database 155 or other data repositories for other items including components, features, functions that would be compatible with the user, the user's devices, the user's preferences, the user's items, or any combination thereof. For example, using the example above, the system 100 may locate another smart bulb that does utilize the same protocol utilized by the smart lighting system owned by the user. In certain embodiments, at step 310, the method 300 may include replacing the first order with the second order or adding the second order to the first order. At step 312, the method 300 may include determining if the first order and/or the second order need further approval before either order is completed. In certain embodiments, the determining may be performed by utilizing the server 140, the server 145, the server 160, the communications network 135, any combination thereof, or by utilizing any other appropriate program, network, system, or device.

If the first order and/or second order do not need further approval before completing (e.g. executing) the order, the method 300 may proceed directly from step 312 to step 320, which includes completing the first order and/or second order so that the order item may be sent (e.g. shipped or transmitted) to the user. If, however, the first order and/or second order are determined to need further approval before completion, the first order and/or second order may be transmitted to a virtual assistant for approval, at step 314 of the method 300. The virtual assistant may be a program (or set of programs) that is configured to further filter or analyze an order to ensure compatibility for the user. In certain embodiments, the virtual assistant may be hosted by and its accompanying functions may be performed by utilizing the server 140, the server 145, the server 160, the communications network 135, any combination thereof, or by utilizing any other appropriate program, network, system, or device.

The virtual assistant may be equipped with various types of artificial intelligence abilities, positive preferences of the user, negative preferences of the user, historical information associated with items that may be ordered, feedback/review for items that may be ordered, any other information or a combination thereof. The virtual assistant may be granted access to all or a subset of information associated with the user, such as, but not limited to, the user purchase history 149, the item history 151, the item interoperability history 152, the user profile 148, any inputs (e.g. preferences) made by the user into the system 100, information associated with items owned by the user, information associated with devices of the user, information associated with networks subscribed to by the user, any information associated with the user, or any combination thereof. Any of the information that is made accessible to the virtual assistant may be utilized to determine whether the order should be approved.

At step 316, the method 300 may include determining if the first order and/or second order have been approved by the virtual assistant. In certain embodiments, the determining may be performed by utilizing the server 140, the server 145, the server 160, the communications network 135, any combination thereof, or by utilizing any other appropriate program, network, system, or device. If the virtual assistant does not approve the first order and/or second order, the method 300 may include, at step 318, rejecting the first order and/or second order. In certain embodiments, the rejecting may be performed by utilizing the server 140, the server 145, the server 160, the communications network 135, any combination thereof, or by utilizing any other appropriate program, network, system, or device. If the first order and/or second order are rejected, the order may not be completed and the user may be prompted to attempt to make a new order for a new item or perform another action relating to the order. If, however, the first order and/or second order have been approved by the virtual assistant, the method 300 may include, at step 320, completing the order so that the order including the item may be transmitted and/or shipped to the user. In certain embodiments, the completing of the order may be performed by utilizing the server 140, the server 145, the server 160, the communications network 135, any combination thereof, or by utilizing any other appropriate program, network, system, or device. Notably, the method 300 may further incorporate any of the features and functionality described for the system 100 or as otherwise described herein.

The systems and methods disclosed herein may include additional functionality and features. For example, in certain embodiments, the user involved in the ordering process may override the virtual assistant's approval or rejection of an order. The user may override the virtual assistant, such as via an option presented on a graphical user interface of application running on the device that the user is using to participate in the ordering process. Additionally, in certain embodiments, if the virtual assistant rejects an order, the virtual assistant may determine another compatible item that the user may be interested in based on the information accessible to the virtual assistant. The virtual assistant may either directly order the compatible item or present the user with the option to execute the order for the compatible item. In certain embodiments, the virtual assistant may reject a certain subset of orders and approve a certain other subset of orders. In certain embodiments, instead of having the virtual assistant reject or approve an order, the systems and methods may include transmitting an order to an actual person or group of people for approval or rejection. The person may review the order and determine whether or not the order should be approved or rejected. The person may input their decision into the system, such as via an application running on a device of the person. For example, the person may be second user 110, who is using third user device 111.

In certain embodiments, the systems and methods may include prompting a user to provide feedback into the system 100. For example, if the system 100 detects that the item that the user is ordering is being utilized by the user to replace an existing item that the user already has at his home, the system 100 may prompt the user to input feedback relating to the existing item that the user is replacing. Similarly, if a user decides not to go through with a particular order, the systems and methods may include prompting the user for feedback as to a reason for not completing the order. Feedback received from a plurality of users for a particular item may be aggregated and may be utilized to assist the virtual assistant in making decisions. The feedback may also be utilized by a filter of the system to either reduce or increase the probability that a particular order is approved. For example, if a particular item has a threshold number of negative feedback responses or a high number of negative feedback responses, the system 100 may factor such information to reduce the likelihood that the particular item is approved by the virtual assistant. Similarly, if a particular item has a threshold number of positive feedback responses or a high number of positive feedback responses, the system 100 may factor such information to increase the likelihood that the particular item is approved by the virtual assistant. In certain embodiments, the feedback may be transmitted to manufacturers of products to assist the manufacturers in determining when to make a product recall, when to replace a product, when to make more of a product, and/or when to update a product.

In certain embodiments, the systems and methods may include transmitting a notification to a user whenever an order is adjusted, whenever the virtual assistant makes a decision, whenever negative feedback is received for an item, whenever positive feedback is received for an item, whenever a conflict is detected between an ordered item and the user's preferences, etc., or any combination thereof. The notification may indicate possible new items that may serve as a replacement for the item that the user originally ordered, along with detailed technical features of such new items. In certain embodiments, based on the information gathered by the system 100, the systems and methods may include auto-ordering certain items that the system 100 determines the user may need. Items may be auto-ordered on a periodic basis, one-time basis, or any other time-based basis. For example, if the system 100 determines that the user has ordered an eight-pack of shaving blades, the system 100 may automatically auto-order a new set of the eight-pack of shaving blades based on manufacturer information that indicates when the original eight-pack of shaving blades are set to expire or are no longer to be used by the user. As another example, if the original item ordered by the user was a shirt and the user has gained thirty pounds since ordering the shirt, the systems and methods may include automatically ordering a larger shirt corresponding to the new weight of the user provided in the user's user profile 148. In certain embodiments, the virtual assistant may perform the auto-order, an actual person may perform the auto-order, or a combination thereof. In certain embodiments, the virtual assistant may perform any of the functions described for the system 100, the method 300, or a combination thereof.

Figure 4:
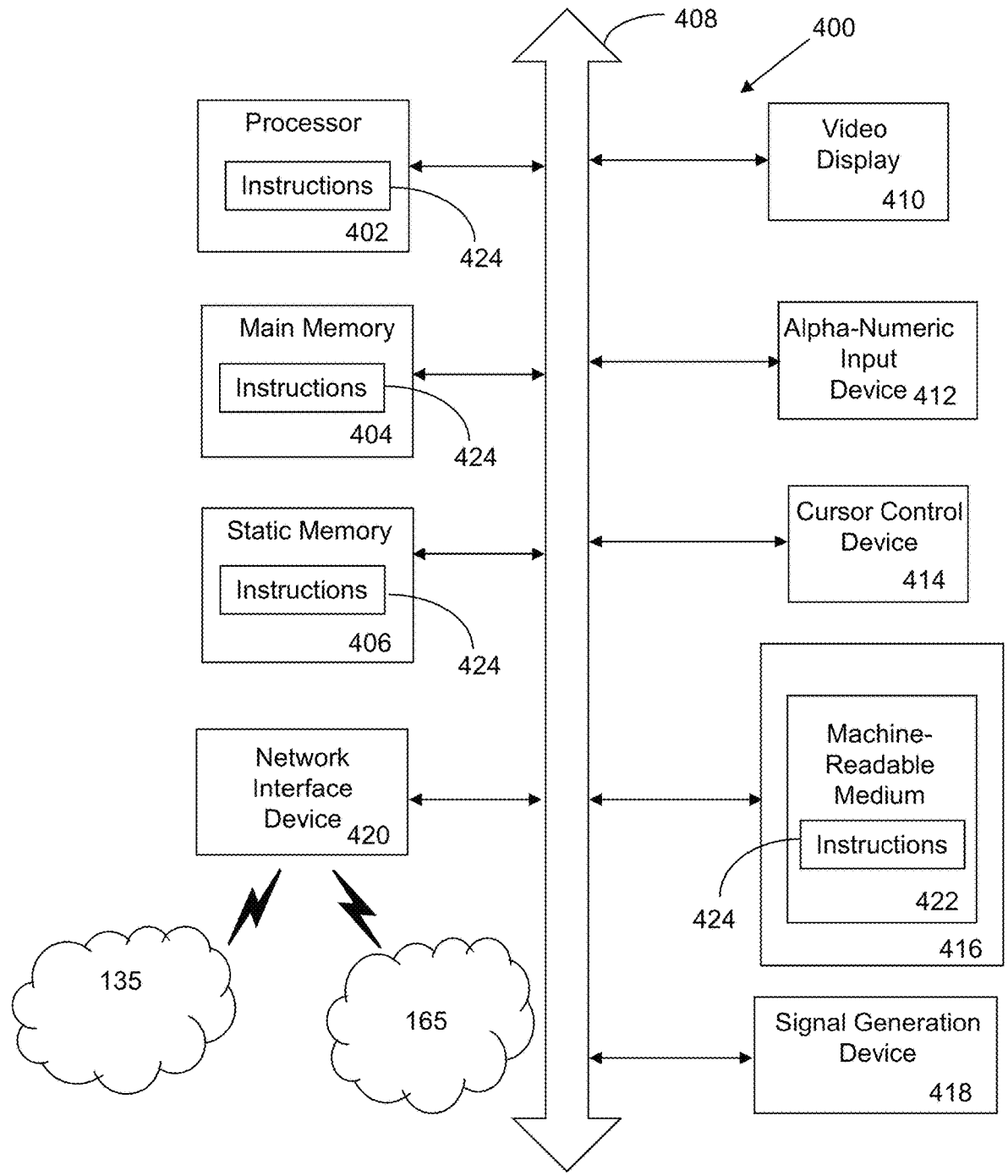
FIG. 4 is a schematic diagram of a machine in the form of a computer system within which a set of instructions, when executed, may cause the machine to perform any one or more of the methodologies or operations of the systems and methods for providing mitigation of returns.

Referring now also to FIG. 4, at least a portion of the methodologies and techniques described with respect to the exemplary embodiments of the system 100 can incorporate a machine, such as, but not limited to, computer system 400, or other computing device within which a set of instructions, when executed, may cause the machine to perform any one or more of the methodologies or functions discussed above. The machine may be configured to facilitate various operations conducted by the system 100. For example, the machine may be configured to, but is not limited to, assist the system 100 by providing processing power to assist with processing loads experienced in the system 100, by providing storage capacity for storing instructions or data traversing the system 100, or by assisting with any other operations conducted by or within the system 100.

In some embodiments, the machine may operate as a standalone device. In some embodiments, the machine may be connected (e.g., using communications network 135, communications network 165, another network, or a combination thereof) to and assist with operations performed by other machines and systems, such as, but not limited to, the first user device 102, the second user device 106, the third user device 111, the server 140, the server 145, the database 155, the server 160, the server 170, or any combination thereof. The machine may be connected with any component in the system 100. In a networked deployment, the machine may operate in the capacity of a server or a client user machine in a server-client user network environment, or as a peer machine in a peer-to-peer (or distributed) network environment. The machine may comprise a server computer, a client user computer, a personal computer (PC), a tablet PC, a laptop computer, a desktop computer, a control system, a network router, switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The computer system 400 may include a processor 402 (e.g., a central processing unit (CPU), a graphics processing unit (GPU, or both), a main memory 404 and a static memory 406, which communicate with each other via a bus 408. The computer system 400 may further include a video display unit 410, which may be, but is not limited to, a liquid crystal display (LCD), a flat panel, a solid state display, or a cathode ray tube (CRT). The computer system 400 may include an input device 412, such as, but not limited to, a keyboard, a cursor control device 414, such as, but not limited to, a mouse, a disk drive unit 416, a signal generation device 418, such as, but not limited to, a speaker or remote control, and a network interface device 420.

The disk drive unit 416 may include a machine-readable medium 422 on which is stored one or more sets of instructions 424, such as, but not limited to, software embodying any one or more of the methodologies or functions described herein, including those methods illustrated above. The instructions 424 may also reside, completely or at least partially, within the main memory 404, the static memory 406, or within the processor 402, or a combination thereof, during execution thereof by the computer system 400. The main memory 404 and the processor 402 also may constitute machine-readable media.

Dedicated hardware implementations including, but not limited to, application specific integrated circuits, programmable logic arrays and other hardware devices can likewise be constructed to implement the methods described herein. Applications that may include the apparatus and systems of various embodiments broadly include a variety of electronic and computer systems. Some embodiments implement functions in two or more specific interconnected hardware modules or devices with related control and data signals communicated between and through the modules, or as portions of an application-specific integrated circuit. Thus, the example system is applicable to software, firmware, and hardware implementations.

In accordance with various embodiments of the present disclosure, the methods described herein are intended for operation as software programs running on a computer processor. Furthermore, software implementations can include, but not limited to, distributed processing or component/object distributed processing, parallel processing, or virtual machine processing can also be constructed to implement the methods described herein.

The present disclosure contemplates a machine-readable medium 422 containing instructions 424 so that a device connected to the communications network 135, communications network 165, another network, or a combination thereof, can send or receive voice, video or data, and communicate over the communications network 135, communications network 165, another network, or a combination thereof, using the instructions. The instructions 424 may further be transmitted or received over the communications network 135, communications network 165, another network, or a combination thereof, via the network interface device 420.

While the machine-readable medium 422 is shown in an example embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding or carrying a set of instructions for execution by the machine and that causes the machine to perform any one or more of the methodologies of the present disclosure.

The terms "machine-readable medium," "machine-readable device," or "computer-readable device" shall accordingly be taken to include, but not be limited to: memory devices, solid-state memories such as a memory card or other package that houses one or more read-only (non-volatile) memories, random access memories, or other rewritable (volatile) memories; magneto-optical or optical medium such as a disk or tape; or other self-contained information archive or set of archives is considered a distribution medium equivalent to a tangible storage medium. The "machine-readable medium," "machine-readable device," or "computer-readable device" may be non-transitory, and, in certain embodiments, may not include a wave or signal per se. Accordingly, the disclosure is considered to include any one or more of a machine-readable medium or a distribution medium, as listed herein and including art-recognized equivalents and successor media, in which the software implementations herein are stored.

The illustrations of arrangements described herein are intended to provide a general understanding of the structure of various embodiments, and they are not intended to serve as a complete description of all the elements and features of apparatus and systems that might make use of the structures described herein. Other arrangements may be utilized and derived therefrom, such that structural and logical substitutions and changes may be made without departing from the scope of this disclosure. Figures are also merely representational and may not be drawn to scale. Certain proportions thereof may be exaggerated, while others may be minimized. Accordingly, the specification and drawings are to be regarded in an illustrative rather than a restrictive sense.

Thus, although specific arrangements have been illustrated and described herein, it should be appreciated that any arrangement calculated to achieve the same purpose may be substituted for the specific arrangement shown. This disclosure is intended to cover any and all adaptations or variations of various embodiments and arrangements of the invention. Combinations of the above arrangements, and other arrangements not specifically described herein, will be apparent to those of skill in the art upon reviewing the above description. Therefore, it is intended that the disclosure not be limited to the particular arrangement(s) disclosed as the best mode contemplated for carrying out this invention, but that the invention will include all embodiments and arrangements falling within the scope of the appended claims.

The foregoing is provided for purposes of illustrating, explaining, and describing embodiments of this invention. Modifications and adaptations to these embodiments will be apparent to those skilled in the art and may be made without departing from the scope or spirit of this invention. Upon reviewing the aforementioned embodiments, it would be evident to an artisan with ordinary skill in the art that said embodiments can be modified, reduced, or enhanced without departing from the scope and spirit of the claims described below.

We claim:

1. A system, comprising:
a memory that stores instructions;
a processor that executes the instructions to perform operations, the operations comprising:
receiving, from a first device of a user, a first order associated with a first item;
detecting a second device on a network associated with the first device of the user;
determining whether the second device detected on the network is turned on and actively being used;
determining whether a third device of the user is disabled and not fully functioning;
applying, by utilizing a conflict engine, a first filter to the first order associated with the first item, wherein the first filter is a subroutine that comprises an interoperability filter that determines whether the first item is technically compatible with the second device detected on the network associated with the first device of the user, wherein the subroutine determines that the first item is technically compatible with the second device detected on the network based on determining that first device specifications of the first item are technically compatible with second device specifications of the second device detected on the network and based on determining that the second device detected on the network is turned on and actively being used;
applying a measurement filter to the first order to determine if a physical dimension of the first item is physically compatible with the user, the second device, the third device, and a physical location associated with the user;
preventing, when the third device is determined to be disabled and not fully functioning, the first filter from factoring in the third device when determining compatibility with the first device;
detecting, based on applying the first filter, applying the measurement filter, and by utilizing the conflict engine, that a first conflict exists between the first item and the second device if the first item is determined to not be compatible with the second device;
generating, based on detecting the first conflict and by adjusting the first order associated with the first item based on detecting the first conflict, a second order associated with a second item that is determined to be compatible with the second device detected on the network associated with the first device of the user; and
receiving, from the first device, feedback associated with the second order when the second order is not executed by the user, wherein the feedback is utilized by another filter to adjust a probability that the second order is approved by a virtual assistant as a replacement for a subsequent order for a different user that is correlated with the first order.

2. The system of claim 1, wherein the operations further comprise applying a second filter to the first order associated with the first item, wherein the second filter comprises a user profile filter for determining whether the first item is compatible with a preference in a user profile of the user.

3. The system of claim 2, wherein the operations further comprise generating a third order by adjusting the second order, wherein the third order is associated with a third item that is determined to be compatible with the second device detected on the network and compatible with the preference in the user profile.

4. The system of claim 1, wherein the operations further comprise transmitting the second order associated with the second item to the virtual assistant for approval.

5. The system of claim 4, wherein the operations further comprise receiving the approval from the virtual assistant if the virtual assistant determines that a second conflict does not exist between the second item and the second device.

6. The system of claim 1, wherein the operations further comprise applying a second filter to the first order associated with the first item, wherein the second filter comprises a user account filter for determining whether the first item is compatible with a plurality of devices associated with a user account of the user; and
   determining, by using the user account filter, whether the first item is compatible with the plurality of devices associated with the user account of the user.

7. The system of claim 1, wherein the operations further comprise transmitting the second order associated with the second item to the first device of the user.

8. The system of claim 1, wherein the operations further comprise transmitting a notification to the first device, wherein the notification identifies the first conflict.

9. The system of claim 1, wherein the operations further comprise transmitting a notification to the first device indicating that the first item has a rate of return higher than a threshold value.

10. The system of claim 1, wherein the operations further comprise determining if the first item is replacing a fourth device detected on the network.

11. The system of claim 10, wherein the operations further comprise transmitting, to the first device, a request for the user to provide feedback relating to the fourth device.

12. The system of claim 1, wherein the operations further comprise applying a second filter to the first order associated with the first item, wherein the second filter comprises the measurement filter, the measurement filter further being for determining if the first item has a size and a weight compatible with existing equipment of the user; and determining, by using the measurement filter, if the first item has the size and the weight compatible with the existing equipment of the user.

13. The system of claim 1, wherein the operations further comprise transmitting, if the user abandons the second order, a request for feedback to the first device; and receiving a rejection of the second order from the virtual assistant if the virtual assistant determines that a second conflict does exist between the second item and the second device.

14. A method, comprising:
   receiving, from a first device of a user, a first order associated with a first item;
   detecting a second device on a network associated with the first device of the user;
   determining whether the second device detected on the network is turned on and actively being used;
   determining whether a third device of the user is disabled and not fully functioning;
   applying, by utilizing a conflict engine, a first filter to the first order associated with the first item, wherein the first filter is a subroutine that comprises an interoperability filter that determines whether the first item is technically compatible with the second device detected on the network associated with the first device of the user, wherein the applying is performed by utilizing instructions from a memory that are executed by a processor, wherein the subroutine determines that the first item is technically compatible with the second device detected on the network based on determining that first device specifications of the first item are technically compatible with second device specifications of the second device detected on the network and based on determining that the second device detected on the network is turned on and actively being used;
   applying a measurement filter to the first order to determine if a physical dimension of the first item is physically compatible with the user, the second device, the third device, and a physical location associated with the user;
   preventing, when the third device is determined to be disabled and not fully functioning, the first filter from factoring in the third device when determining compatibility with the first device;
   detecting, based on applying the first filter, applying the measurement filter, and by utilizing the conflict engine, that a first conflict exists between the first item and the second device if the first item is determined to not be compatible with the second device;
   generating, based on detecting the first conflict, a second order associated with a second item that is determined to be compatible with the second device detected on the network associated with the first device of the user;
   transmitting the second order associated with the second item to the first device; and
   receiving, from the first device, feedback associated with the second order when the second order is not executed by the user, wherein the feedback is utilized by another filter to adjust a probability that the second order is approved by a virtual assistant as a replacement for a subsequent order for a different user that is correlated with the first order.

15. The method of claim 14, further comprising applying a second filter to the first order associated with the first item, wherein the second filter comprises a user profile filter for determining whether the first item is compatible with a preference in a user profile.

16. The method of claim 14, further comprising applying a second filter to the first order associated with the first item, wherein the second filter comprises a user account filter for determining whether the first item is compatible with a plurality of devices associated with a user account of the user; and
   determining, by using the user account filter, whether the first item is compatible with the plurality of devices associated with the user account of the user.

17. The method of claim 14, further comprising transmitting the second order associated with the second item to the virtual assistant for approval.

18. The method of claim 17, further comprising receiving a rejection of the second order from the virtual assistant if the virtual assistant determines that a second conflict does exist between the second item and the second device.

19. The method of claim 14, further comprising applying a second filter to the first order associated with the first item, wherein the second filter comprises an order history filter for determining whether the first item is compatible with a third item previously ordered by the user; and determining, by using the order history filter, whether the first item is compatible with the third item previously ordered by the user.

20. A non-transitory computer-readable device comprising instructions, which when executed by a processor, cause the processor to perform operations comprising:

receiving, from a first device of a user, a first order associated with a first item;

detecting a second device on a network associated with the first device of the user;

determining whether the second device detected on the network is turned on and actively being used;

determining whether a third device of the user is disabled and not fully functioning;

applying, by utilizing a conflict engine, a first filter to the first order associated with the first item, wherein the first filter is a subroutine that comprises an interoperability filter that determines whether the first item is technically compatible with the second device detected on the network associated with the first device of the user, wherein the subroutine determines that the first item is technically compatible with the second device detected on the network based on determining that first device specifications of the first item are technically compatible with second device specifications of the second device detected on the network and based on determining that the second device detected on the network is turned on and actively being used;

applying a measurement filter to the first order to determine if a physical dimension of the first item is physically compatible with the user, the second device, the third device, and a physical location associated with the user;

preventing, when the third device is determined to be disabled and not fully functioning, the first filter from factoring in the third device when determining compatibility with the first device;

detecting, based on applying the first filter, applying the measurement filter, and by utilizing the conflict engine, that a first conflict exists between the first item and the second device if the first item is determined to not be compatible with the second device;

generating, based on detecting the first conflict and by adjusting the first order associated with the first item based on detecting the first conflict, a second order associated with a second item that is determined to be compatible with the second device;

transmitting the second order associated with the second item to the first device; and receiving, from the first device, feedback associated with the second order when the second order is not executed by the user, wherein the feedback is utilized by another filter to adjust a probability that the second order is approved by a virtual assistant as a replacement for a subsequent order for a different user that is correlated with the first order.

\* \* \* \* \*